US011245643B2

(12) United States Patent
Matosevic et al.

(10) Patent No.: US 11,245,643 B2
(45) Date of Patent: Feb. 8, 2022

(54) SPECULATIVE RESOURCE ALLOCATION FOR ROUTING ON INTERCONNECT FABRICS

(71) Applicant: Tenstorrent Inc., Toronto (CA)

(72) Inventors: Ivan Matosevic, Toronto (CA); Ljubisa Bajic, Toronto (CA)

(73) Assignee: Tenstorrent Inc., Toronto (CA)

( * ) Notice: Subject to any disclaimer, the term of this patent is extended or adjusted under 35 U.S.C. 154(b) by 53 days.

(21) Appl. No.: 16/879,405

(22) Filed: May 20, 2020

(65) Prior Publication Data

US 2021/0367905 A1  Nov. 25, 2021

(51) Int. Cl.
*H04L 12/18* (2006.01)
*H04L 12/911* (2013.01)
*H04L 12/933* (2013.01)
*H04L 12/923* (2013.01)

(52) U.S. Cl.
CPC .......... *H04L 47/828* (2013.01); *H04L 47/741* (2013.01); *H04L 47/746* (2013.01); *H04L 47/762* (2013.01); *H04L 49/101* (2013.01); *H04L 49/1507* (2013.01)

(58) Field of Classification Search
CPC ... H04L 47/828; H04L 47/741; H04L 47/746; H04L 47/762; H04L 49/101; H04L 49/1507; G06F 15/1735; G06F 15/7807; G06F 15/7825; G06F 9/3005; G06F 9/3881; G06F 9/541
USPC ........................................................ 370/432
See application file for complete search history.

(56) References Cited

U.S. PATENT DOCUMENTS

| 5,583,990 A | 12/1996 | Birrittella et al. |
| 5,859,981 A | 1/1999 | Levin et al. |
| 8,103,165 B2 | 1/2012 | O'Krafka et al. |
| 9,036,482 B2 | 5/2015 | Lea |
| 9,244,880 B2 | 1/2016 | Philip et al. |
| 9,473,388 B2 | 10/2016 | Kumar et al. |

(Continued)

FOREIGN PATENT DOCUMENTS

KR  101465498 B1  11/2014

OTHER PUBLICATIONS

An overview about Networks-on-Chip with multicast support; Marcelo Daniel Berejuck Software and Hardware Integration Laboratory Federal University of Santa Catarina Rua Pedro João Pereira, Dec. 2018.*

(Continued)

*Primary Examiner* — Robert J Lopata
(74) *Attorney, Agent, or Firm* — Daylight Law, P.C.

(57) ABSTRACT

Methods and systems related to speculative resource allocation for routing on an interconnect fabric are disclosed herein. One disclosed method includes speculatively allocating a collection of resources to support a set of paths through an interconnect fabric. The method also includes aggregating a set of responses from the set of paths at a branch node on the set of paths. If a resource contention is detected, the set of responses will include an indicator of a resource contention. The method will then further include transmitting, from the branch node and in response to the indicator of the resource contention, a deallocate message downstream and the indicator of the resource contention upstream, and reallocating resources for the multicast after a hold period.

24 Claims, 9 Drawing Sheets

(56) References Cited

U.S. PATENT DOCUMENTS

| | | | |
|---|---|---|---|
| 9,509,613 | B1 | 11/2016 | Denzel et al. |
| 9,571,402 | B2 | 2/2017 | Kumar et al. |
| 9,590,813 | B1 | 3/2017 | Kumar et al. |
| 2008/0232387 | A1* | 9/2008 | Rijpkema ............... H04L 45/00 370/420 |
| 2015/0043575 | A1* | 2/2015 | Kumar ................... H04L 45/16 370/390 |
| 2015/0188848 | A1* | 7/2015 | Tran ...................... H04L 49/254 370/390 |
| 2016/0308793 | A1* | 10/2016 | Levy-Abegnoli ....... H04L 45/16 |
| 2016/0344629 | A1* | 11/2016 | Gray ..................... H04L 49/106 |
| 2020/0195546 | A1* | 6/2020 | Ibrahim ................ H04L 49/203 |
| 2021/0034373 | A1* | 2/2021 | Capalija ................. G06F 9/541 |
| 2021/0204360 | A1* | 7/2021 | Cherif ................. H04L 43/0811 |

OTHER PUBLICATIONS

Berejuck, "An Overview About Networks-on-Chip with Multicast Support", arXiv:1610.00751v1, Oct. 3, 2016, accessed online at https://arxiv.org/abs/1610.00751, 6 pages.

Lu, et al., "Connection-oriented multicasting in wormhole-switched networks on chip," IEEE Computer Society Annual Symposium on Emerging VLSI Technologies and Architectures (ISVLSI'06), Karlsruhe, 2006, pp. 6 pp.-, doi: 10.1109/ISVLSI.2006.31.

W. Dally and B. Towles, "Principles and Practices of Interconnection Networks", ISBN 0-12-200751-4, Mogran Kaufmann, USA, 2004.

Wu et al., "A Hybrid Multicast Routing Approach with Enhanced Methods for Mesh-Based Networks-on-Chip", IEEE Transactions on Computers, vol. 67, Issue: 9, Sep. 1, 2018, accessed online at https://ieeexplore.ieee.org/document/8309347, 6 pages.

Chen et al., "Totally Ordered Gigabit Multicasting", Distributed Systems Engineering, Institute of Physics Publishing, Bristol, Great Britain, vol. 4, No. 4, Dec. 1997, pp. 229-243.

Extended European Search Report dated Aug. 11, 2021 from European Application No. 21174862.9, 12 pages.

\* cited by examiner

NoC 100

SPECULATIVE RESOURCE ALLOCATION FOR ROUTING ON INTERCONNECT FABRICS

BACKGROUND

Modern large-scale systems-on-a-chip (SoC) devices can integrate numerous instances of various functional blocks including processing cores, accelerators, memory, and off-chip interfaces. Additionally, modern SoCs can integrate blocks that were traditionally not even implemented on a chip such as radio frequency communication blocks and micro-electro-mechanical blocks. The increased degree of integration has been driven by the efficiencies in speed and power consumption realized by SoCs and the costs savings associated with building a single chip instead of many. To realize these benefits a communication system must be set up to allow the various blocks to communicate with high-bandwidth and low-latency. Traditional approaches for implementing such a communication system involved the inclusion of an on-chip bus or dedicated wiring for specific signals. However, dedicated wiring is resource intensive and not efficient as the wiring will often remain idle, and on-chip buses are failing to scale with the increased bandwidth requirements of modern SoCs.

The modern solution for inter-block communication in an SoC involves the use of a dedicated network in the form of an interconnect fabric. As used herein, the term "interconnect fabric" refers to a programmable system which transports data between terminals of the system wherein the system is programmed via the writing of control information to individual routers associated with the terminals. A router, and any terminal that may be associated with the router, can be referred to as a "node" in the interconnect fabric. When an interconnect fabric is located entirely within a single chip it can be referred to as a network-on-chip (NoC). Data can be transported through the interconnect fabric along a sequence of nodes from one terminal to another. A sequence of nodes can be referred to as a "path" through the interconnect fabric.

FIG. 1 illustrates a portion of a NoC 100 for an SoC in the form of a multicore processor in which the terminals of the fabric are four processing cores 101, 102, 103, and 104. The illustrated processing cores are linked using four routers 110, 111, 112, and 113. The processing cores and routers form nodes of the interconnect fabric. The routers communicate with their associated processing core using a network interface unit (NIU) located on each processing core. Data can be transmitted amongst the cores using unicast, multi-cast, or broadcast transmissions. In traditional approaches, the transmissions in a fabric can be single-hop or multi-hop depending upon the topology of the network and the physical location of the source and destination cores within the network. For example, in NoC 100 adjacent cores 101 and 102 may be able to communicate using a single-hop transmission while distal cores 101 and 104 may need to communicate via multi-hop transmissions as data is passed in series between adjacent routers and forwarded from each intermediate router on to the destination router.

Interconnect fabrics can efficiently distribute data amongst multiple terminals with high bandwidth and efficient resource utilization by sharing the same network resources for many different transmissions through the fabric. However, design efforts are required to assure an equitable and efficient distribution of these resources to the various terminals that are connected to the fabric. For example, one condition that must be avoided or mitigated is referred to in the technical literature as a deadlock condition in which two separate transmissions require the same resources and each one is blocked from completing and releasing the shared resources by the alternative transmission. An illustration of this occurrence is shown in the block diagram 200 of FIG. 2 in which terminals 201 and 202 are the source and destination terminals for unicast path 211, terminals 203 and 204 are the source and destination terminals for unicast path 212, and terminals 205 and 206 are the source and destination terminals for unicast path 213. In the illustrated case, deadlock would occur if there were insufficient buffers and channels on at least two of the illustrated terminals that are along at least two of the illustrated paths. For example, if node 204 cannot support flow for both paths 213 and 212, node 201 cannot support flow for both paths 213 and 211, and node 203 cannot support flow for both paths 211, and 212, then flow in all three unicasts will be blocked without any way to move forward. Although only two paths are required to create a deadlock condition, three paths were used in this example to illustrate the fact that deadlock can sometimes involve high numbers of paths and complex interdependencies thereof.

SUMMARY

Methods and systems related to the efficient operation of an interconnect fabric are disclosed herein. Specific methods and systems disclosed herein include the speculative allocation of resources to support a set of paths through an interconnect fabric for a transmission using the interconnect fabric, the aggregation of a set of responses from the set of paths, the conditional allocation or deallocation of those resources based on that set of responses, and the reallocation of those resources after a hold period if those resources were deallocated. The resources are speculatively allocated in that it is not known ex ante whether or not the paths required to support the transmission will be fully available or if a resource contention with another transmission through the interconnect fabric will be detected during the allocation of those resources. If a response indicates a contention was detected, the resources can be deallocated to wait for the other transmission to complete. The resources can then be reallocated later to complete the transmission. Although the process of deallocating resources in the event of a detected contention is non-negligible, the Applicant has found that in specific implementations the number of detected contentions is low for reasonable workloads and that the benefits associated with rapid speculative allocation outweigh the drawbacks of deallocation.

Interconnect fabrics in accordance with specific embodiments of the invention disclosed herein support various transmissions in a manner that avoids deadlock conditions while also being highly scalable. Specific embodiments disclosed herein are highly scalable in that they require no central arbiter or negotiations between source nodes to allocate resources for potentially conflicting transmissions. Instead, resources are speculatively assigned, and distributed logic programmed into the various nodes of the interconnect fabric detects potential contention, aggregates responses, and prevents deadlock conditions from occurring without central coordination. These disclosed approaches can accordingly operate in an interconnect fabric without regard to the time it takes for a message to be transmitted across the fabric and without regard to the time it takes for all nodes to be notified of the actions of other nodes. Indeed, in specific embodiments of the invention, the disclosed routing approach is an emergent property of the individual nodes such that the size of the fabric has no appreciable impact on routing and flow control through the fabric.

The approaches utilizing speculative allocation in an interconnect fabric disclosed herein are broadly applicable to any form of transmission in an interconnect fabric. However, in specific embodiments of the invention, the disclosed methods and systems are deployed to support multicast transmissions on the interconnect fabric with long data bursts for each transmission. Specifically, with long data bursts the additional overhead associated with speculative allocation will be less appreciable relative to the time of the transmission. As a nonlimiting example, in a standard sized modern NoC for parallel computing applications, transfers on the order of several tens of kilobytes or more per transmission are relatively long enough that the time required to speculatively allocate resources for the transmission in accordance with specific embodiments disclosed herein would be relatively unappreciable. This particular example is described in more detail with reference to step 303 in FIG. 3 below. Furthermore, the disclosed methods can be deployed to support transmissions which are multipath multicast transmissions in which the paths through the interconnect fabric include at least one branch node from which two or more paths stem. Specific disclosed approaches are of particular use in multipath multicast transmissions due to the lack of known solutions for avoiding resource contentions using an intelligent compiler or routing algorithm which are designed to entirely avoid resource contention conditions ex ante. Instead, since specific approaches disclosed herein efficiently and rapidly deallocate resources upon the detection of a contention, deadlock is avoided entirely as one potentially blocking transmission will always be allowed to finish and not be blocked by another, without the transmissions needing to be coordinated ahead of time. Additionally, using these disclosed approaches the multiple paths required to support a multicast transmission can be assigned in parallel without the need for global ordering of the individual paths.

The approaches disclosed herein are broadly applicable to any interconnect fabric connecting any set of terminals such as an SoC with various types of circuit blocks. However, in specific embodiments of the invention, the disclosed methods and systems are deployed in an interconnect fabric which connects a set of terminals in the form of a set of parallel processors executing a directed graph for a neural network. As modern neural networks operate on large data structures and can require those data structures to be distributed to a large number of processors in parallel, an interconnection network that can efficiently execute multipath multicasts with large data burst is particularly beneficial when applied in this setting.

In specific embodiments of the invention, in which a set of responses from various nodes are aggregated, the set of responses can be generated at specific nodes in the interconnect fabric at which a possible deadlock risk was detected. A possible deadlock risk can be detected at a node by detecting a resource contention at the node. For example, a node could detect that a request is for a given resource at the node to support N+1 transmissions where N is the number of simultaneous transmissions that the particular resource can support. In this manner, and using the specific approaches disclosed herein, speculative allocation of resources is conducted locally on a node-by-node basis without any information regarding a global state of the interconnect fabric while still avoiding the occurrence of deadlock conditions despite the interconnect fabric supporting a number of transmissions through the fabric. In specific embodiments, this functionality arises from the emergent behavior of distributed logic where each node is programmed to act in concert using hardware logic alone. In specific embodiments of the invention disclosed herein, the allocation, deallocation, and reallocation of resources in the fabric can all be conducted in hardware alone, such as in distributed logic and routers in the interconnect fabric. As such, the overhead associated with speculative allocation and deallocation can be minimized.

In specific embodiments of the invention, a method for conducting a multicast on an interconnect fabric is disclosed. The method comprises allocating a collection of resources to support a set of paths through the interconnect fabric, whereby the set of paths are speculatively allocated for the multicast. The method also comprises aggregating a set of responses from the set of paths at a branch node on the set of paths. The set of responses include an indicator of a resource contention. The method also comprises transmitting, from the branch node and in response to the indicator of the resource contention, a deallocate message downstream and the indicator of the resource contention upstream. The method also comprises deallocating, in response to the indicator of the resource contention, the collection of resources for a hold period. The method also comprises reallocating resources for the multicast after the hold period.

In specific embodiments of the invention, an interconnect fabric is disclosed. The fabric comprises a set of nodes, a set of routers, and a collection of distributed logic circuits. The set of nodes and the set of routers have a one-to-one correspondence. The collection of distributed logic circuits are distributed among the set of nodes and are programmed to execute a method for conducting a multicast on the interconnect fabric. The nodes can be manually programmed or programmed using a hardware description language such as VHDL, Verilog, or other programming languages which result in the production of a design for a digital or mixed signal hardware circuit. The program is then implemented in logic gates, registers, crossbars, memory, and other circuit elements. The method comprises allocating a collection of resources on the set of routers to support a set of paths through the set of nodes. The set of paths are speculatively allocated for the multicast of data. The method also comprises aggregating a set of responses from the set of paths at a branch node in the set of nodes. The set of responses include an indicator of a resource contention. The method also comprises transmitting, from the branch node and in response to the indicator of the resource contention, a deallocate message downstream and the indicator of the resource contention upstream. The method also comprises deallocating, based on the aggregated set of responses, the collection of resources for a hold period. The method also comprises reallocating resources for the multicast after the hold period.

In specific embodiments of the invention, a method for supporting a multicast on an interconnect fabric is provided. The method comprises receiving, at a branch node on the interconnect fabric, an allocate message for a resource to support a path for the multicast. The method also comprises transmitting, from the branch node, the allocate message to a set of paths that stem from the branch node. The method also comprises transmitting from the branch node and in response to an indicator of a resource contention, a downstream deallocate message to at least one of the paths in the set of paths. The method also comprises transmitting from the branch node and in response to the indicator of the resource contention, an upstream indicator of the resource contention.

In specific embodiments of the invention, a node for an interconnect fabric is disclosed. The node comprises a router and a logic circuit programmed to execute a method for supporting a multicast on the interconnect fabric. The logic circuit is programmed to execute a method for conducting a multicast on the interconnect fabric. The logic circuit can be manually programmed or programmed using a hardware description language such as VHDL, Verilog, or other programming languages which result in the production of a design for a digital or mixed signal hardware circuit as are known in the art. The method comprises receiving, at the router, an allocate message for a resource to support a path for the multicast. The method also comprises transmitting, using the router, the allocate message to a set of paths that stem from the branch node. The method also comprises receiving, at the router, a set of responses from the set of paths that stem from the node, wherein the set of responses include an indicator of a resource contention. The method also comprises transmitting, using the router and in response to the indicator of the resource contention, a downstream deallocate message to at least one of the paths in the set of paths. The method also comprises transmitting, using the router and in response to the indicator of the resource contention, an upstream indicator of the resource contention.

DETAILED DESCRIPTION

Methods and systems for speculative resource allocation routing on interconnect fabrics in accordance with the summary above are disclosed in detail herein. The methods and systems disclosed in this section are nonlimiting embodiments of the invention, are provided for explanatory purposes only, and should not be used to constrict the full scope of the invention. Although the specific examples provided in this section are directed to an interconnect fabric in the form of an NoC, the approaches disclosed herein are broadly applicable to any interconnect fabric. Furthermore, interconnect fabrics in accordance with this disclosure can be implemented on a single chip system, in a multichip single package system, or in a multichip system in which the chips are commonly attached to a common substrate such as a printed circuit board (PCB), interposer, or silicon mesh. Interconnect fabrics in accordance with this disclosure can also include chips on multiple substrates linked together by a higher-level common substrate such as in the case of multiple PCBs each with a set of chips where the multiple PCBs are fixed to a common backplane. Furthermore, although the specific examples provided in this section are directed to a double directional regular square network topology, the approaches disclosed herein are more broadly applicable to networks with various topologies including single or double directional topologies and tree, mesh, torus, and other topologies. Indeed, it is a benefit of specific approaches disclosed herein that responses can be fully aggregated, and resources fully deallocated, regardless of the regularity or irregularity of the interconnect fabric topology. Furthermore, although specific examples provided in this section are directed to wormhole flow control on an interconnect fabric, the approaches disclosed herein are more broadly applicable to any type of flow control on an interconnect fabric including any type of cut-through packet buffer flow control or flit buffer flow control. As used herein, the term "flit" refers to the smallest unit of data that is recognized by the flow control system of an interconnect fabric. Furthermore, although specific examples provided in this section refer to the resources of a node as being buffers and crossbar channels, the disclosed approaches are more broadly applicable to the monitoring of any resources that can be speculatively assigned and maintained for the transmission of data through an interconnect fabric.

Figure 1:
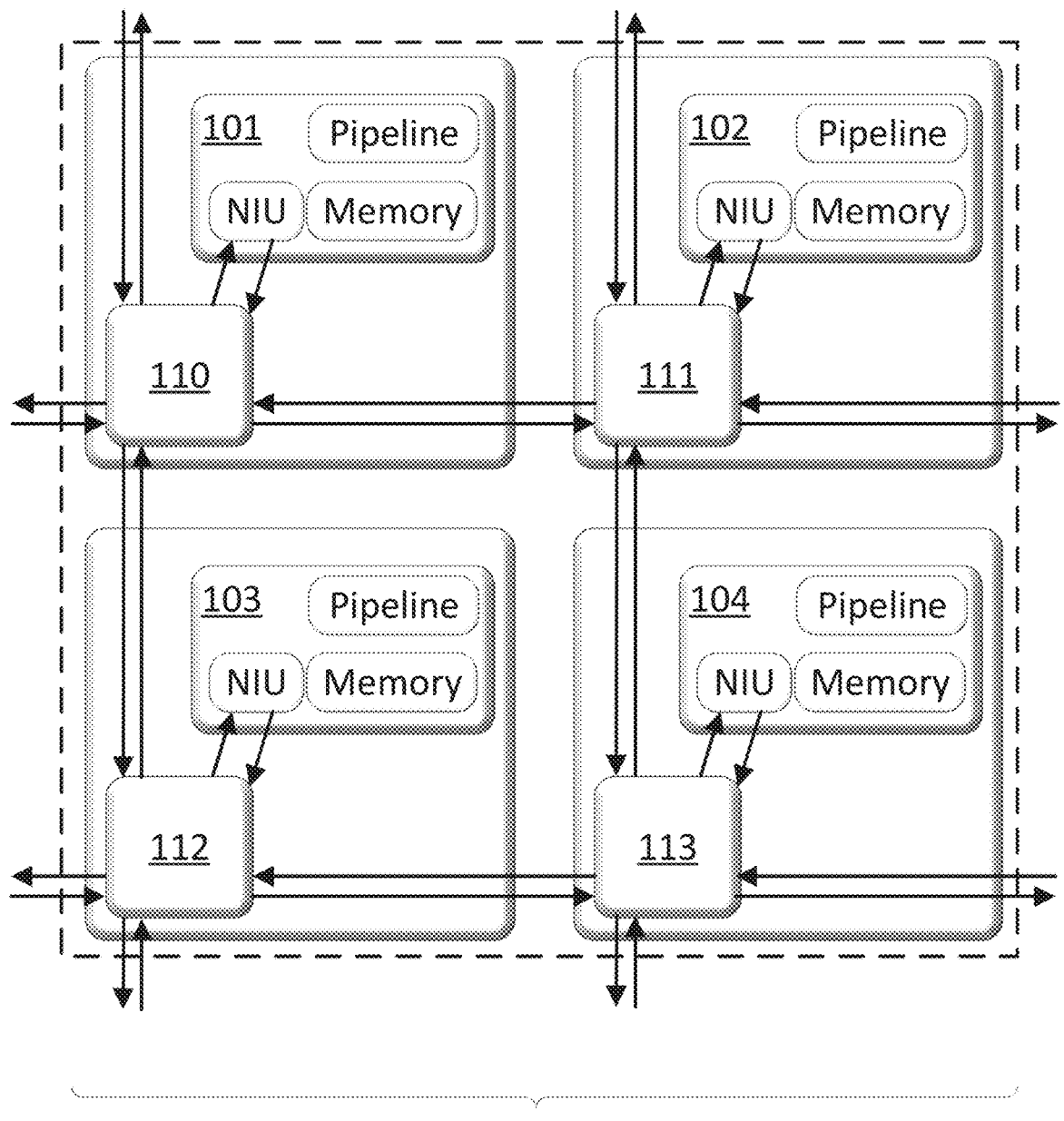
FIG. 1 illustrates a portion of a NoC in accordance with the related art.
Figure 2:
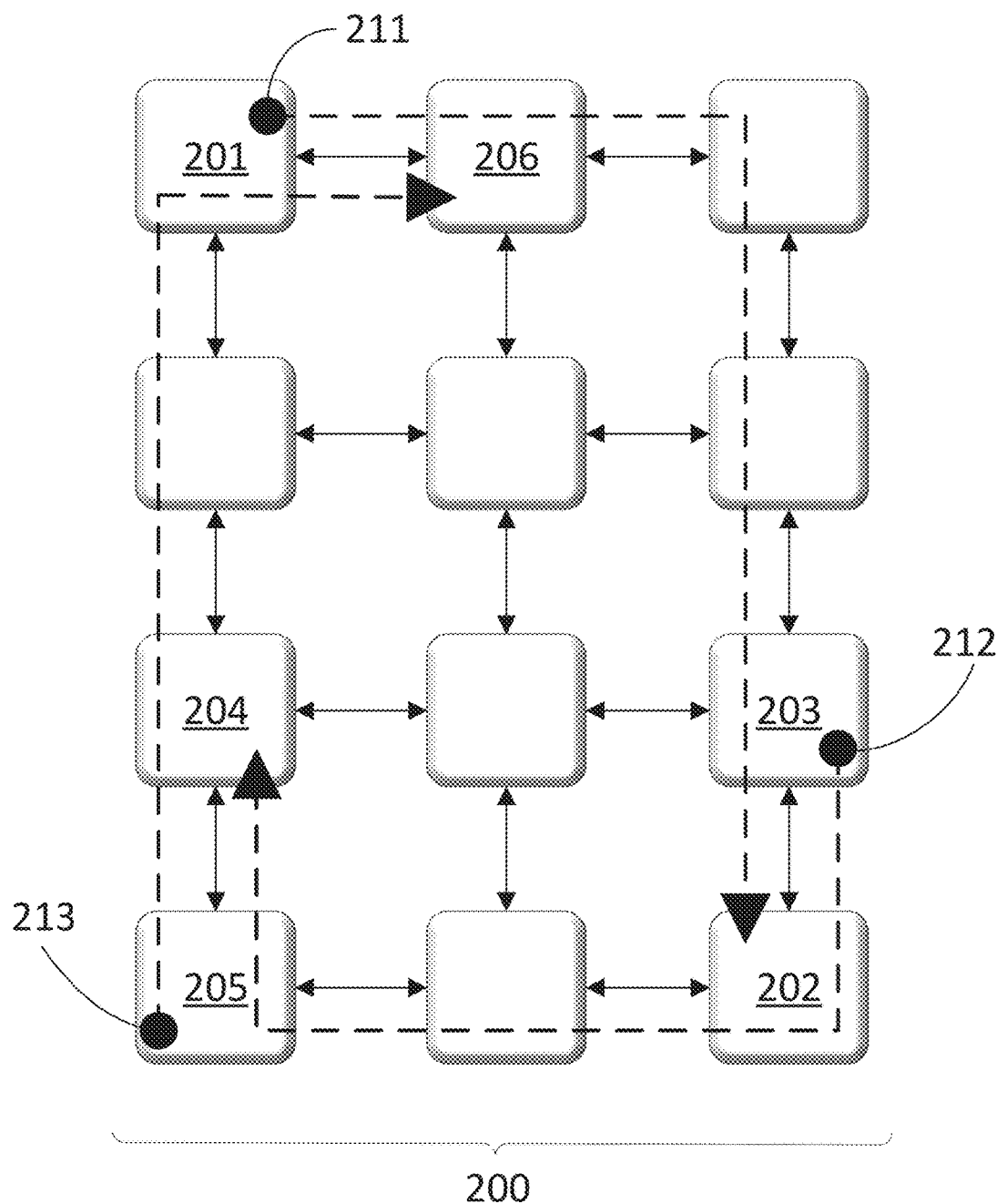
FIG. 2 illustrates an interconnect fabric experiencing a deadlock condition in accordance with the related art.
Figure 3:
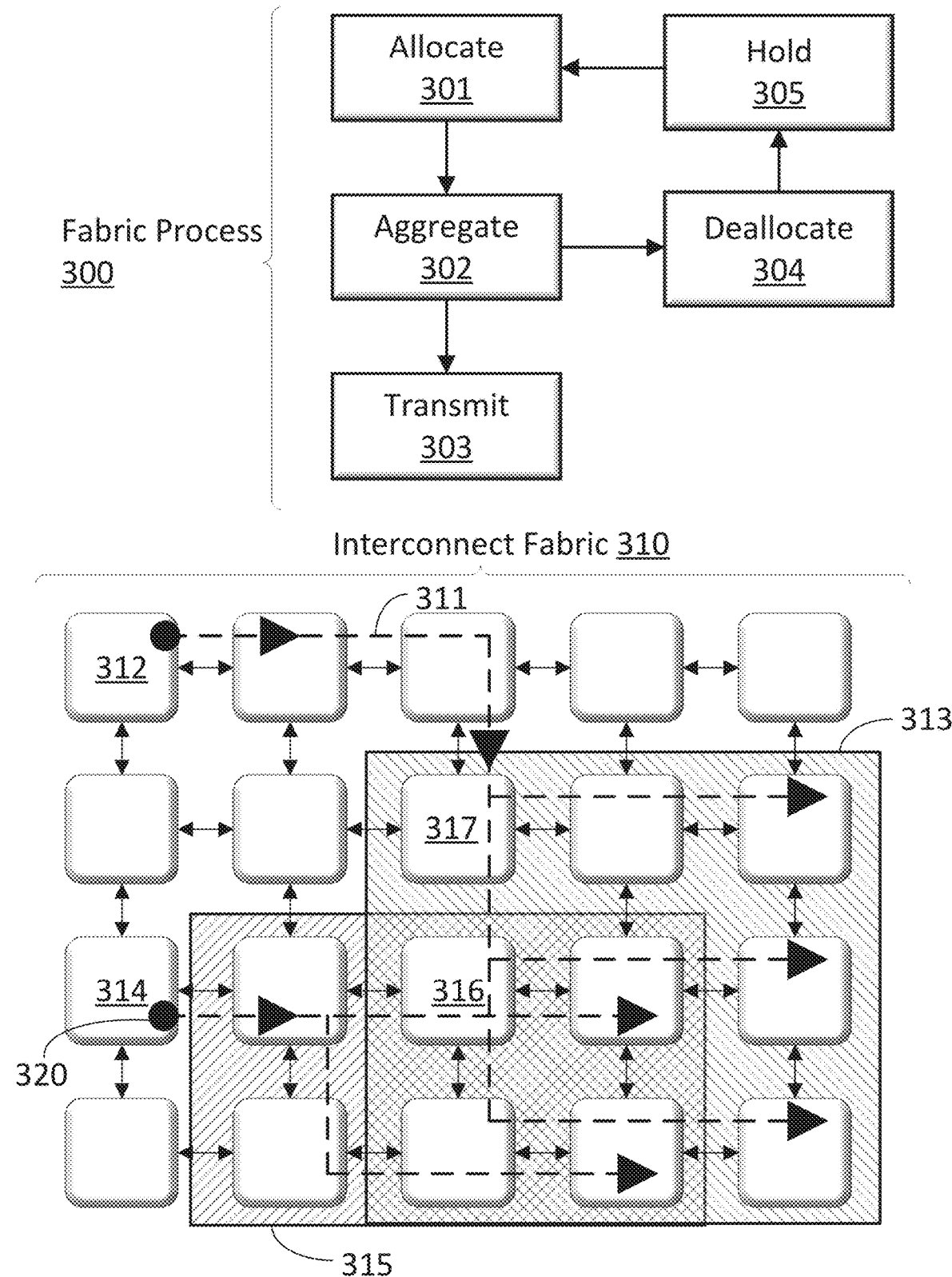
FIG. 3 illustrates a flow chart for conducting a multicast on an interconnect fabric and a block diagram of an interconnect fabric in the process of allocating resources for a multicast that are in accordance with specific embodiments of the invention disclosed herein.
Figure 4:
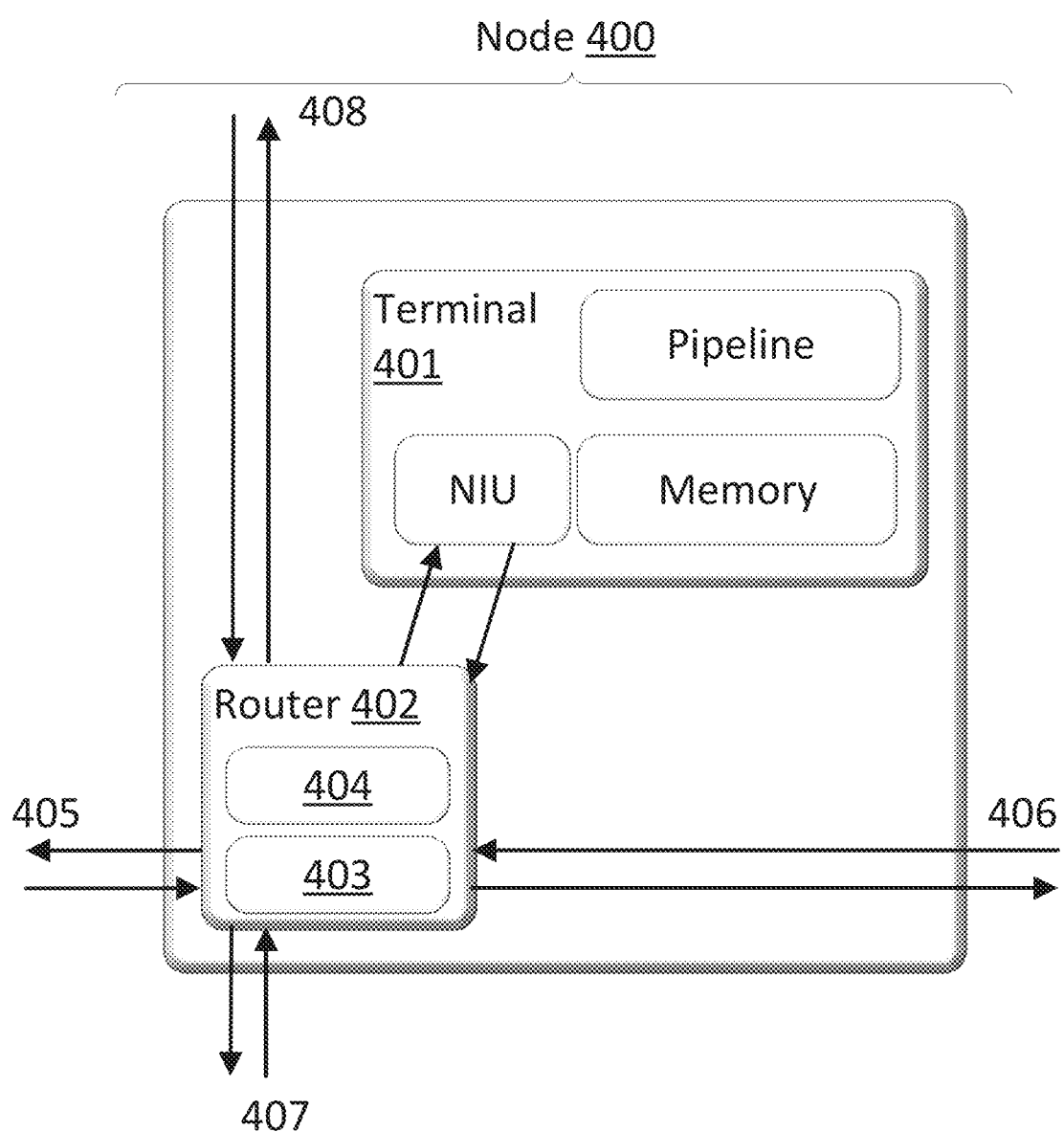
FIG. 4 illustrates a block diagram of the contents of a node from a set of nodes that form an interconnect fabric in accordance with specific embodiments of the invention disclosed herein.

FIG. 3 illustrates a flow chart 300 for conducting a multicast on an interconnect fabric and a block diagram 310 of an interconnect fabric in the process of allocating resources for a multicast that are in accordance with specific embodiments of the invention disclosed herein. The steps of flow chart 300 are conducted by the interconnect fabric. However, in specific embodiments of the invention, the steps result from the emergent behavior of the various nodes using distributed logic. The behavior of individual nodes is described in more detail in FIGS. 4-7. The behavior of specific nodes is described throughout this disclosure with reference to "source" nodes, "branch" nodes, "intermittent" nodes, and "termination" nodes. However, in specific embodiments of the invention, each node in the interconnect network can include logic to execute the behavior of multiple node types to support multiple transmissions through the network at different times. Different logic can be activated based on the receipt of routing and flow control information at the node. For example, a node may serve as a source node for one transmission and a termination node for another transmission based on where data needs to be routed through the fabric. Furthermore, in specific embodiments of the invention, the same node can serve as multiple types of nodes at the same time if it is concurrently supporting multiple transmissions. The assignment of nodes to specific node types can be conducted by receiving routing and flow control information. In specific embodiments of the invention, the routing and flow control information can arrive on the same hardware lines as the data for the transmission. The difference between data and control information can be encoded in headers of information passed through the fabric. Alternatively, the headers of information passed through the fabric can always include control information while the body holds the data. In specific embodiments of the invention, routing and flow control information can arrive at a node on different dedicated signal lines that are separate from the lines used to route transmission data.

Flow chart 300 begins with a step 301 of allocating a collection of resources to support a set of paths through the interconnect fabric, whereby the set of paths are speculatively allocated for the multicast. With reference to block diagram 310, the multicast could be multicast 311 from source node 312 with a set of termination nodes 313. As illustrated, block diagram 310 includes a set of nodes including source node 312 and a second source node 314 meaning that there is the potential for a deadlock condition between two transmissions from these two different source nodes. Multicast 311 is a multipath multicast as it expands into a set of three paths to route the data efficiently to the set of termination nodes 313. Multicast 311 requires resources on each of the nodes along the line indicating multicast 311 as movement through the interconnect fabric involves multi-hop transmissions of data from one node to the next. The paths are speculatively allocated in that source node 312, and the intermittent nodes along the paths that form multicast 311, are initially unaware of the fact that a subset of the nodes in the set of termination nodes 313 are also in a second set of termination nodes 315 for multicast 320. In the illustrated case, if individual nodes such as node 316 do not have sufficient resources to support both multicast 311 and multicast 320, a resource contention could occur between the two multicasts.

In specific embodiments of the invention, allocation occurs without any information regarding a global state of the interconnect fabric and on a node-by-node basis as allocation requests propagate along a path of a transmission, such as a set of paths that comprise a multipath multicast. The allocation request can take the form of an allocate message being passed along from node-to-node along the paths that form multicast 311. The process can also involve copies of the allocation request being generated and sent to different branches by branch nodes such as branch node 317. Branch node 317 is a "branch" for multicast 311 as multiple downstream paths on multicast 311 stem from branch node 317. However, branch node 317 can have similar routing and flow control logic to other nodes in the network and just be temporarily configured to serve as a branch node for multicast 311. In specific embodiments of the invention, the allocate message can be the header flit of a wormhole flow-controlled packet. The node can include a logic circuit programmed to allocate resources on the node upon evaluating the allocate message, copy the allocate message as needed, and then forward the allocate message or messages downstream.

In specific embodiments of the invention, the action of the nodes can be highly parallel. As routing control can be conducted without reference to a global state, each node can include a logic circuit from a distributed logic circuit to manage the allocation of resources required for the execution of step 301 and for conducting the additional method steps from flow chart 300. For example, block diagram 400 in FIG. 4 could be a common diagram for all the nodes in block diagram 310. In specific embodiments, not only the network aspects of the nodes are the same, but the terminals of the nodes could likewise match. For example, each node in interconnect fabric 310 could include a terminal 401 in the form of a processing core from a set of processing cores linked by the interconnect fabric, and a router 402 from a set of routers routing data through the interconnect fabric. Terminal 401 is a processing core with a network interface unit connected to the router, a processing pipeline, and a memory. The memory could store routines for execution by the pipeline as well as the data on which those routines operate. Multicast 311 could accordingly be a multicast distributing data for a composite computation being executed by the set of processing cores. The composite computation could involve the execution of a directed graph to draw an inference from a neural network. However, in other embodiments the nodes will differ in terms of the terminals they link to the interconnect fabric. For example, the terminals could be a fully homogenous set of blocks in a SoC that exchange data for the combined effort of the system.

In specific embodiments of the invention, the resources that are allocated on each node of the interconnect fabric in the execution of step 301 can include crossbars and buffers which are allocated by logic circuits on the node in response to a received allocate message. In the illustrated case, the steps of the method of flow chart 300 can be conducted by a distributed logic circuit instantiated by logic circuits on each of the nodes of the fabric such as logic circuit 403 and resources on the routers on each of the nodes such as resources 404. The logic circuit could be part of a distributed logic circuit distributed among the set of nodes in the form of a set of matching logic circuits located on the set of nodes in a one-to-one correspondence. Node 400 includes resources 404 on router 402 in the form of a set of crossbar channels that can route data between the various external lines 405, 406, 407, and 408 and the terminal 401, and in the form of buffers that can temporarily store data when a channel is in use. The buffers and crossbar channels can be speculatively allocated for a transmission, such as multicast 311, in response to the receipt of an allocate message by the router. The allocate message can be the header flit of a wormhole flow-controlled packet. The logic circuit can be programmed to allocate the resources upon evaluating the allocate message.

In specific embodiments of the invention, the nodes can provide a set of responses in exchange for the allocate messages. The responses can indicate if resources were successfully allocated or if a resource contention was encountered. The responses could be generated by logic circuits, such as logic circuit 403, and transmitted upstream from the node. The logic circuits can also be programmed to generate a success response if resources were successfully allocated and transmit that response upstream. The logic circuits can also be programmed to generate, at a node and in response to detecting a resource contention, an indicator of a resource contention. The logic circuits can also be programmed to transmit the indicator of the resource contention upstream in the form of a response. In specific embodiments of the invention, the generation of the success response could be conditionally conducted based on a determination that a node was a termination node. The upstream and downstream directions of a transmission through a node could be stored in memory on the router of the node as an allocate message is received and/or as resources on the node are allocated. The status of the node in terms of which type of node it was serving as for a particular transmission could also be maintained in memory on the router of the node.

Figure 5:
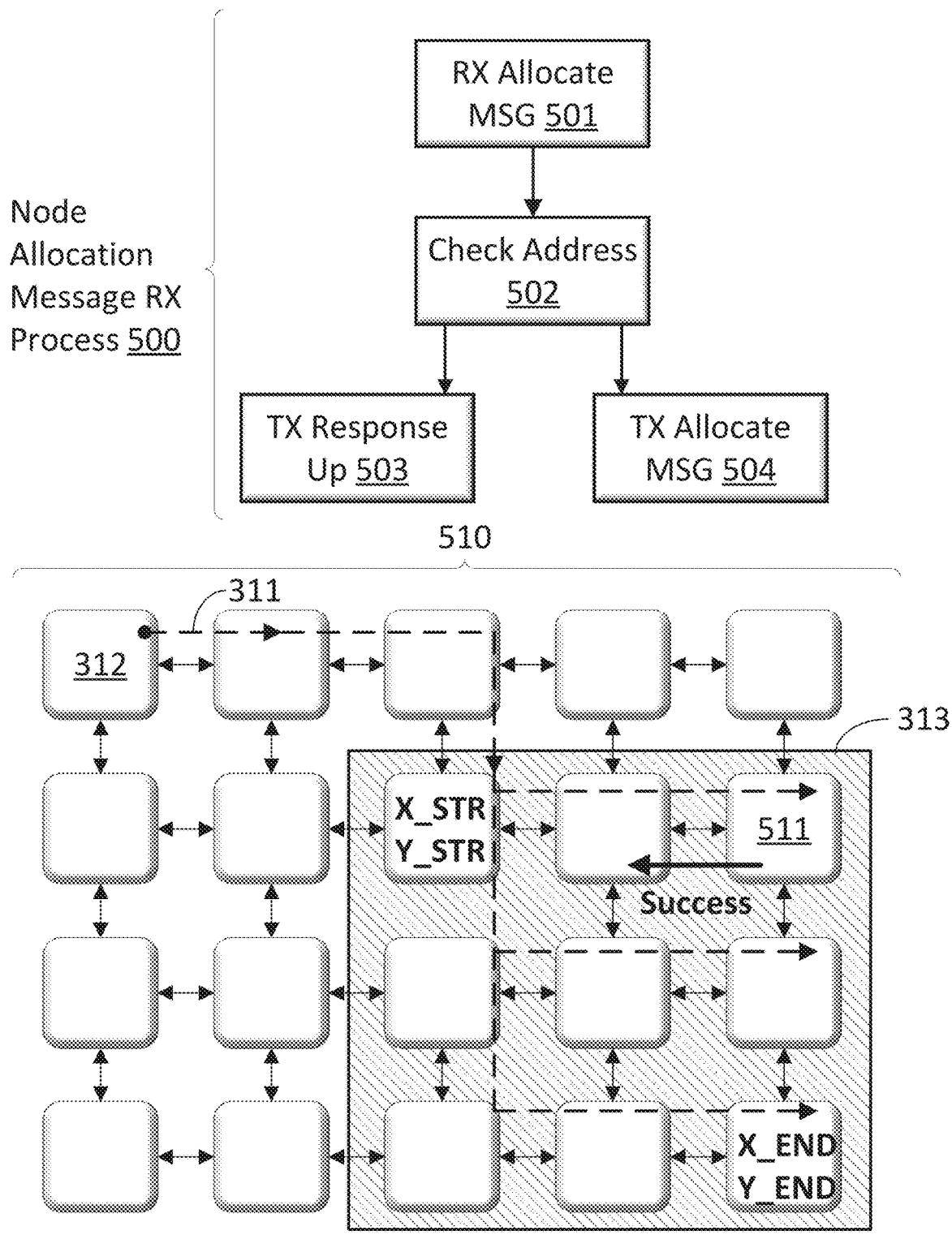
FIG. 5 illustrates a flow chart for an allocate message node process and a block diagram of an interconnect fabric executing a flow through that flow chart in accordance with specific embodiments of the invention disclosed herein.

FIG. 5 illustrates a flow chart 500 for the behavior of a termination node on an interconnect fabric and a block diagram 510 of an interconnect fabric forwarding a success response upstream in accordance with specific embodiments of the invention disclosed herein. Flow chart 500 includes a set of steps conducted by a logic circuit on termination node 511 in block diagram 510. The node is referred to as a termination node because it is the final hop on a path of multipath multicast 311. However, as with the branch node mentioned above there is not necessarily anything that permanently distinguishes termination node 511 as such besides the temporary execution of specific logic flows associated with being a terminal point for multicast 311.

Flow chart 500 commences with a step 501 of receiving an allocate message for a resource to support a path of a transmission, such as multicast 311, at a node, such as termination node 511. The logic circuit of the node can be programmed to allocate resources for the multicast or detect a contention as will be described below. However, assuming the allocation is successful, the logic can furthermore, depending upon the allocate message and the location of the node on the multicast, either transmit the allocate message downstream or transmit a success message upstream. In specific embodiments of the invention, termination nodes will transmit success messages upstream and intermittent nodes will not. The allocate message could be the header flit of a wormhole flow-controlled packet. The resource could be a crossbar and/or buffer on the node.

In specific embodiments of the invention, the logic circuit of a node will check the address of the allocate message to determine how the node should react. Indeed, in specific embodiments of the invention, a node will not know what role it is meant to serve for a particular transmission until it does so. Accordingly, flow chart 500 continues with a step 502 of checking the address in the allocate message. A node can use this check of the allocate message to determine which role the node will play in a given transmission and what steps should be subsequently conducted.

Block diagram 510 illustrates the execution of flow chart 500 by a termination node. As illustrated in block diagram 510 the destination nodes of multicast 311 are unambiguously defined by two addresses (X_STR, Y_STR) and (X_END, Y_END). The logic circuits of a termination node, such as termination node 511, can use this information, along with information regarding prior nodes that the path has been through, ex ante knowledge regarding the topology, and/or knowledge of the source address obtained from the allocate message, to determine that it is a termination node. At this point, the logic circuit of the termination node can then execute a step 503 in which, assuming there is no resource contention at node 511, a response in the form of a success message is returned upstream. The intermediate nodes on the paths that form multicast 311 can be programmed to forward any success messages received from downstream further upstream.

Flow chart 500 also includes a step 504 in which an allocate message is transmitted from the node to downstream nodes. This step would be conducted if it were determined in step 502 that the node was an intermittent node or branch node. The allocate message could be transmitted from the branch node to a set of paths that stem from the branch node. The identification of the node as an intermittent node or branch node can be determined using similar approaches to those described above for determining if the node were a termination node.

Although the example of a multicast destination encoded as a rectangle was provided in FIG. 5 for purposes of explanation, the approaches disclosed herein generalize to any multicast set where a node place on a path of the transmission can be determined from routing coordinates and an allocate message allocates one or multiple output ports in each hop. Specifically, if an allocate message allocates multiple output ports, the node will activate the branch node logic routines described herein whereas if an allocate message allocates a single output port, the node will activate an intermittent node logic routine, and if a packet does not allocate any output ports, the node will activate a termination node logic routine.

In specific embodiments of the invention, the responses from various nodes that have been speculatively allocated to form one or more paths for a transmission through an interconnect fabric can be aggregated in order for the fabric to determine the success or failure of the allocation. Specific embodiments of the invention disclosed herein aggregate the responses in such a way that all of the nodes that could potentially be involved in a transmission will be assured to be informed of the failure of a speculative allocation regardless of when along the process of assigning the resources the contention is detected and where in the fabric the contention is detected. As with other behaviors of the fabric disclosed herein, this aggregation is an emergent property of the fabric that arises from the behavior of the logic circuits of individual nodes acting in combination. In particular, the responses of different paths of a multipath multicast can be aggregated, evaluated, and acted upon at the branch nodes of the multicast.

Flow chart 300 continues with a step 302 of aggregating a set of responses from the set of paths that form at least a portion of a transmission at a branch node on the set of paths. The set of responses can be aggregated via the forwarding logic of the response messages as they are transmitted among the nodes that form the multicast. In particular, the set of responses can be forwarded upstream by intermittent nodes and held for aggregated evaluation by branch nodes. The logic circuit of a branch node could keep track of how many paths stem from the branch, and hold for a response from each branch, before evaluating the responses in combination. The responses that are received first could be held in buffers. The set of responses can indicate that there was no resource contention detected during the assignment of resources. For example, the termination nodes and downstream branch nodes of all the paths that stem from a branch node can include logic blocks to return a success signal, and the branch node can hold to receive responses from all of those nodes during the aggregation of responses. Alternatively, the set of responses can indicate that a resource contention was detected during the assignment of resources.

In specific embodiments of the invention, a logic circuit of a branch node can be configured to conduct different actions based on an evaluation of the aggregated response. For example, the combined analysis of the aggregated responses could evaluate to a fail condition if any of the responses indicated a failed allocation and could evaluate to a success condition only if all of the responses indicated a successful allocation. The logic could be triggered to conduct different routines for a fail condition as for a success condition. For example, for a success condition the branch node could itself return a success signal to be passed upstream to additional branch nodes or the source node of the transmission. Alternatively, for a fail condition, the branch node could return the indicator of the resource condition upstream and notify other downstream paths of the failed allocation.

Figure 6:
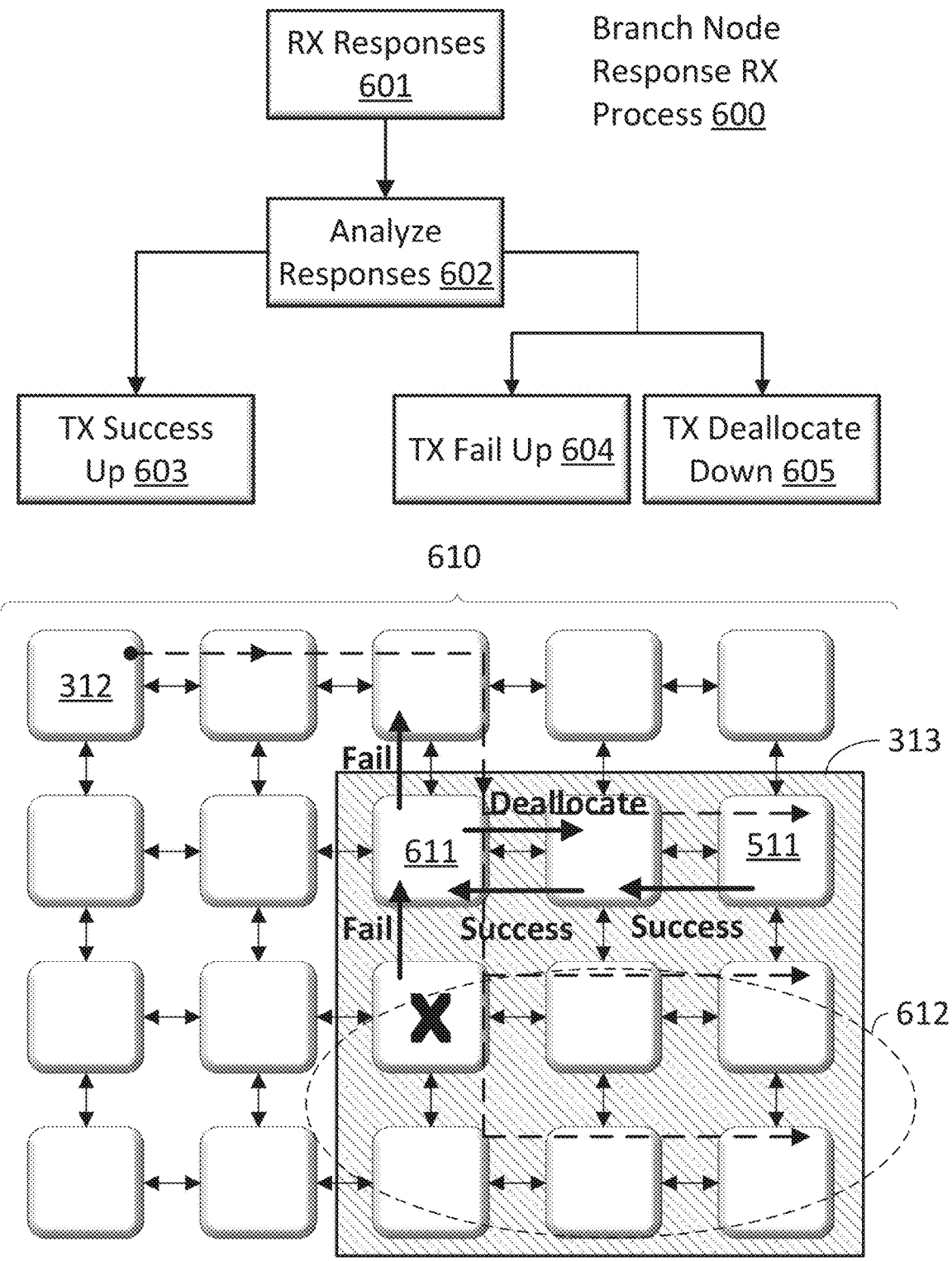
FIG. 6 illustrates a flow chart for a branch node process and a block diagram of an interconnect fabric executing a flow through that flow chart in accordance with specific embodiments of the invention disclosed herein.

FIG. 6 illustrates a flow chart 600 for aggregating a set of responses from a set of paths on a branch node of an interconnect fabric and responding thereto and a block diagram 610 of an interconnect fabric executing a flow through flow chart 600 in accordance with specific embodiments of the invention disclosed herein. Flow chart 600 beings with a step 601 of receiving a set of responses at a branch node. The branch node could be branch node 611 in block diagram 610. The responses could be received on the same lines that are used for the transfer of the routing information and transmission data between the various nodes in block diagram 610. If the interconnect fabric is a double directional fabric, multicast data sent downstream could be sent on data lines and the responses could be sent upstream on corresponding data lines used for upstream data transfers in the other direction. The responses could alternatively be sent on dedicated lines between nodes in the interconnect fabric. The dedicated lines could be upstream and/or downstream dedicated lines that form the same set of hops as are used for routing multicast data through the fabric. As illustrated, two paths branch from branch node 611. One branch returns a success response generated by termination node 511 and the other branch returns an indicator of a resource contention in the form of a failure message as generated by one of the nodes in set 612. Using the approaches disclosed herein, the contention could occur on any of the nodes in the set of nodes 612 and the fail response will be aggregated appropriately to result in a fail response being routed to branch node 611.

Flow chart 600 continues with a step 602 in which the aggregated messages are analyzed. The branch node can evaluate all the received responses by placing them in buffers and then applying them to a set of logic gates for evaluation when all the reserved buffers are filled. The number of reserved buffers can be set based on a count of the number of paths that stem from the branch node. The logic circuit can implement an AND operation such that only if all the responses are successes, will a success message be passed upstream, while if any response includes a fail message, a different set of events is executed.

The step of passing a success message upstream is illustrated by step 603. The step involves generating or forwarding a success message up to the source of data for the node. The step can be conducted using dedicated signal lines for this signal. The branch node, and any intermittent or termination node, can have routing information stored temporarily to support the transmission which will allow the node to keep track of which direction is upstream along the transmission.

The steps taken if any of the responses indicate a failed allocation include steps 604 and 605. The steps can include transmitting, from the branch node and in response to the indicator of the resource contention, a deallocate message downstream and the indicator of the resource contention upstream. In step 604 a fail message is transmitted from the branch node back upstream. This is illustrated by branch node 611 sending a fail signal along a path of the multicast back to source node 312. In step 605 a deallocate message is passed downstream from the branch node. This is illustrated by branch node 611 sending a deallocate message down along a path of the multicast towards termination node 511. The deallocate message can be sent on dedicated signal lines or the same signal lines used for transmission data. In particular, if a specific interconnect fabric uses wormhole routing in which the tail flit of a packet is used to deallocate resources at a given node, the deallocate messages could be transmitted and acted upon in essentially the same manner as those tail flits. Upon receipt of a deallocate message, the distributed logic of the interconnect fabric can be designed to release control of any resources that are reserved on the node that receives the deallocation signal. The logic of the branch node can be programmed to send the deallocate message downstream on every branch that stems from the branch node. In specific embodiments, the branch node can be programmed to only send the deallocate message downstream on all branches that stem from the branch node and responded with a success response. In these embodiments, the branch nodes, intermittent nodes, source node, and termination nodes can be programmed to deallocate resources for the multicast in response to receiving a fail message such that any branch which reports a fail will already have been deallocated when the fail response is generated and forwarded upstream. The intermittent nodes can be programmed to deallocate based on the receipt of the message and forward the deallocate message further downstream.

In specific embodiments of the invention, the aggregate performance of the interconnect fabric that emerges from the response of specific nodes to the indicator of the resource contention will result in the interconnect fabric operating in concert to deallocate resources that were speculatively allocated to support a transmission. This functionality is shown as step 304 in flow chart 300 which shows the interconnect fabric holding for a hold period before reallocating resources for the multicast in a second iteration of step 301. As described above, the individual nodes in the interconnect fabric can each be programmed to deallocate any resources reserved for a transmission in response to the receipt of a deallocate message or an indicator of a resource contention. For example, a fail message routed from downstream or a deallocate message routed from upstream can cause a node to release any resources that had been reserved for the transmission to which those messages relate. As a result, the aggregate performance of the node after all responses have been aggregated will be a full deallocation of resources for the transmission. The resources of the interconnect fabric will then be available to support another transmission, such as the one that caused the resource contention in the first place.

In addition to deallocating any allocated resources, the interconnect fabric can wait to retry the transmission after a hold period. The logic to control the hold period can be provided by a logic circuit in a source node of the transmission. In particular the logic to determine a duration of, and enforce, the hold period can be provided by a logic circuit in a source node of the transmission. The routine required to set and enforce the hold period can be initiated upon receipt of an indicator of a resource contention, such as a fail message, by the source node. This functionality is shown as step 305 in flow chart 300.

As an alternative to deallocating resources and holding to reallocate, the source node can commence the transmission. This functionality is shown as step 303 in flow chart 300. After the completion of step 303, the multicast will be complete, and the resources associated with the transmission can be deallocated. In general, the amount of time required before the source node can begin transmitting will be the time it takes for the source node to get an indication of successful tree allocation which will be in time $t=(2*D*L)$ where D is the distance in number of hops to the most remote destination in the multicast and L is single hop latency of transmissions through the fabric. In a single directional regular square topology NoC with less than 100 terminals (such that the maximum distance D was on the order of 20)

and which could transmit several tens of bytes (e.g., 16, 32, or 64) per cycle, the time t above would typically evaluate to a time period equivalent to the transmission of several hundreds or low thousands of bytes. As such, a transmission of several tens of kilo-bytes would find this time to transmission relatively unappreciable, and workloads that regularly involved transmissions of that length or longer would be relatively unaffected by this wait time. In specific embodiments of the invention, since branch nodes hold to receive responses from all paths that stem from the branch node, and only transmit a success message upstream when they have heard back from each path, when the source node receives a success message the aggregation of responses will be complete for the entire fabric, and the source node will know that all resources have been allocated for the transmission when a success message is received. In specific embodiments of the invention, the transmission can commence prior to receiving confirmation that the resources have been successfully allocated. In other words, the fabric will not need to wait the full 2DL time period before beginning to transmit. With reference to flow chart 300, this would mean that step 303 begins before all the responses have been aggregated, and even before all the resources have been allocated for the transmission. Interconnect fabrics that exhibit this characteristic can be referred to as practicing speculative transmission in addition to speculative allocation.

In specific embodiments of the invention, speculative transmission can be conducted in various ways. The transmission of data can begin before all the responses are aggregated. The transmission of data can begin immediately following the transmission of allocate messages from the source node. Alternatively, the transmission of data can begin after a wait period. These embodiments are best applied to situations in which the incomplete writing of data along the path of a multicast does not have any irreversible side effects. For example, in some environments, writing transmission data to a register on a node triggers a routine on that node which increments a counter that cannot be reset by subsequent routing or flow control information sent to that node. As another example, in some environments, writing transmission data to a register on a node causes a write to an address that cannot easily be deleted or overwritten. As a result, there is no way for the routing or flow control systems of the interconnect fabric to inform the higher-level systems that the multicast failed and to reverse the write. In these implementations, it may be advisable to hold on writing any of the data for the multicast until all responses have been aggregated successfully. In implementations in which writes do result in side effects, but those side effects are reversible, such as setting a counter or writing to a register that needs to be zeroed or cleared if the allocation of resources fails, the wait period for speculative transmission can be calibrated to balance the investment in writing data and the cost of reversing that process against the likelihood of success in the assignment of resource for the transmission.

In specific embodiments, a source node can be programmed to implement a hold period in various ways. The hold period does not need to be set using any specific information regarding the transmission that caused the resource contention. As such there is no need for global coordination or inter-source coordination and negotiation in order to share resources on the interconnect fabric. Instead, the hold period can be derived solely using data that is programmed into the source node or that is past to the source node in the indication of the resource contention. For example, the fail message could include information regarding the distance to the location of contention from the source node which is taken into account during the determination of the hold period or a counter for the number of transmission attempts could be kept at the source node which is likewise taken into account for calculating the hold period. The hold period can be a fixed value set equal to the average time it takes for a multicast on the interconnect fabric to complete. In this way, the interconnect fabric will have a reasonable degree of confidence that any transmission that caused a conflict will be complete by the time resources are reallocated. This fixed value can be determined at design time or updated periodically based on measurements taken while the interconnect fabric is servicing the terminals in the execution of their standard workloads. The hold period can also be a random value with a deviation set by the principles mentioned or a random value from the above-mentioned fixed value. Such an approach would assure that multiple transmissions that were blocked by an initial multicast did not subsequently continue to reserve resources for overlapping resources at the exact same time and continue to block each other in a never-ending loop. The hold period could also be set to increase each time the transmission was forced to hold. The hold period could also increase exponentially each time the transmission was forced to hold. The source node can increment a counter each time an allocation message is sent out on a given path to keep track of the number of allocation attempts for these purposes. The source node could also be designed to throw a deadlock flag to a higher-level system if a maximum number of iterations were exceeded. The higher-level system could initiate a global resource allocation routine to stop the system from looping.

Figure 7:
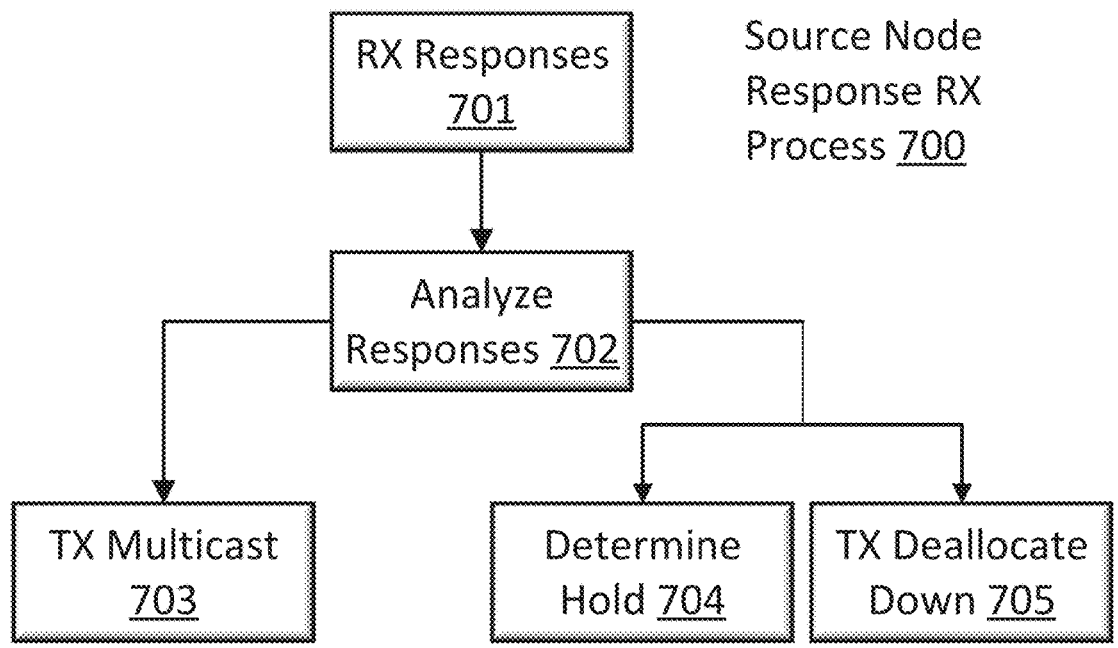
FIG. 7 illustrates a flow chart for a source node process and a block diagram of an interconnect fabric executing a flow through that flow chart in accordance with specific embodiments of the invention disclosed herein.
Figure 7:
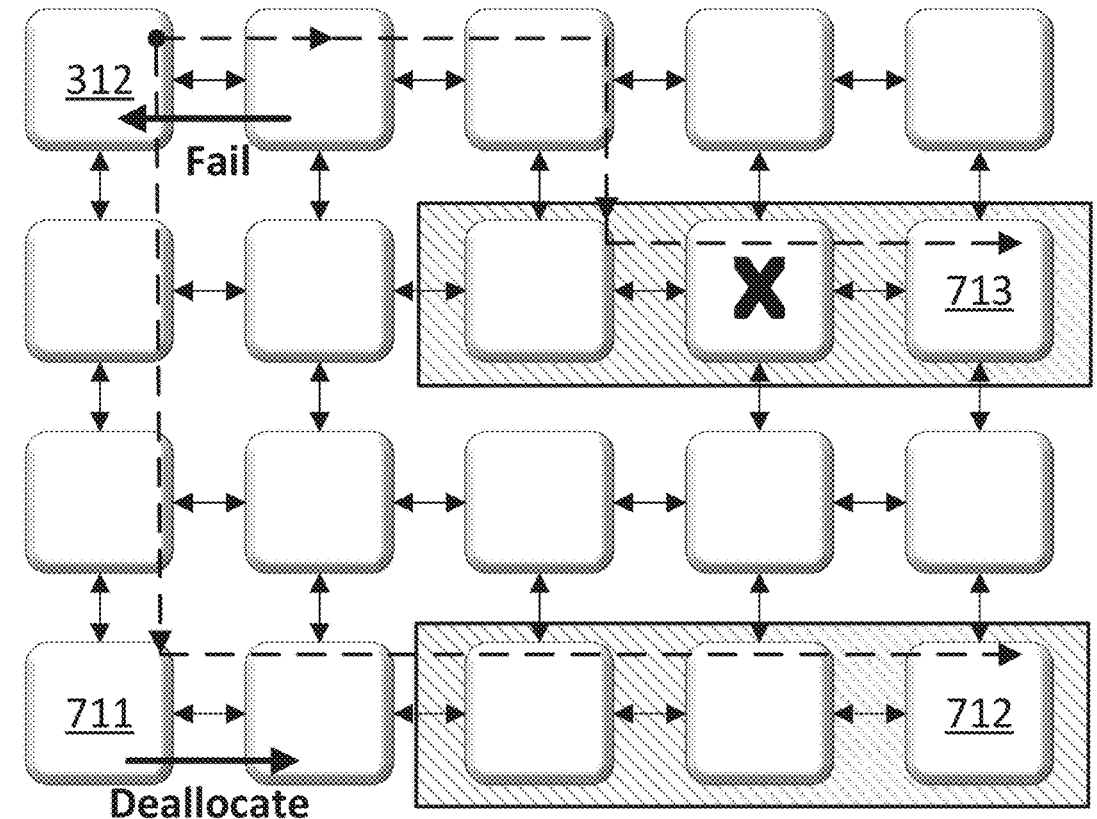

FIG. 7 illustrates a flow chart 700 for the processing of a set of responses and the execution of a response thereto by a source node and a block diagram 710 of an interconnect fabric executing a flow through flow chart 700. The processes all begin with the source node receiving response from the one or more branches that will be used to support a transmission from the source node. The intermittent nodes on these branches can be programmed to forward any responses received from downstream back upstream. Branch nodes on these branches can be programmed to conditionally send a response upstream after aggregating responses from their various branches. Nodes at which a resource contention is detected can be programmed to generate a response and transmit it upstream. Accordingly, in step 701, source node 312 can process a set of responses from the various paths it requires for its transmission. In block diagram 710 this includes a path down to intermittent node 711 on to termination node 712 and a second path to termination node 713. The block diagram 710 illustrates the fact that a source node such as source node 312 may receive multiple responses which it must analyze because a source node can have multiple branches which stem from the source node. The responses can include a success message from all the termination nodes to which the source node will transmit data, such as nodes 713 and 712. Alternatively, and as illustrated, at least one response can be an indicator of a resource contention, such as a fail message generated in response to a resource contention detected while allocating resources along the path to termination node 713.

Flow chart 700 continues with a step 702 in which responses from the various paths that will be used to support a transmission from the source node are analyzed. The step can include similar aggregation and evaluation logic to that described above with reference to a branch node executing step 602. In particular, the source node can be programmed to proceed with a step 703 and initiate a transmission if and only if all branches respond with a success message, or, if the interconnect fabric is programmed for speculative transmission, the transmission can commence prior to the receipt of a success message. Furthermore, the source node can be programmed to proceed with steps 704 and determine a hold period and step 705 and transmit a deallocate message downstream if any of the branches respond with a fail message. The determination of the hold period can be conducted in any of the various ways described above. The deallocate message can be sent in step 705 if the source node has multiple branches and one node responds with a failure message while another responds with a success message or has not responded. The distributed logic of the interconnect fabric can be programmed such that the deallocate message is passed downstream and either proceeds all the way to a termination node such as node 712 or meets an upstream traveling indication of a resource contention as an intermittent node such as node 711, and a full deallocation of all resources is achieved in either event. Branching nodes can also be programmed to push a deallocate message downstream on branches on which they have not yet received responses.

Figure 8:
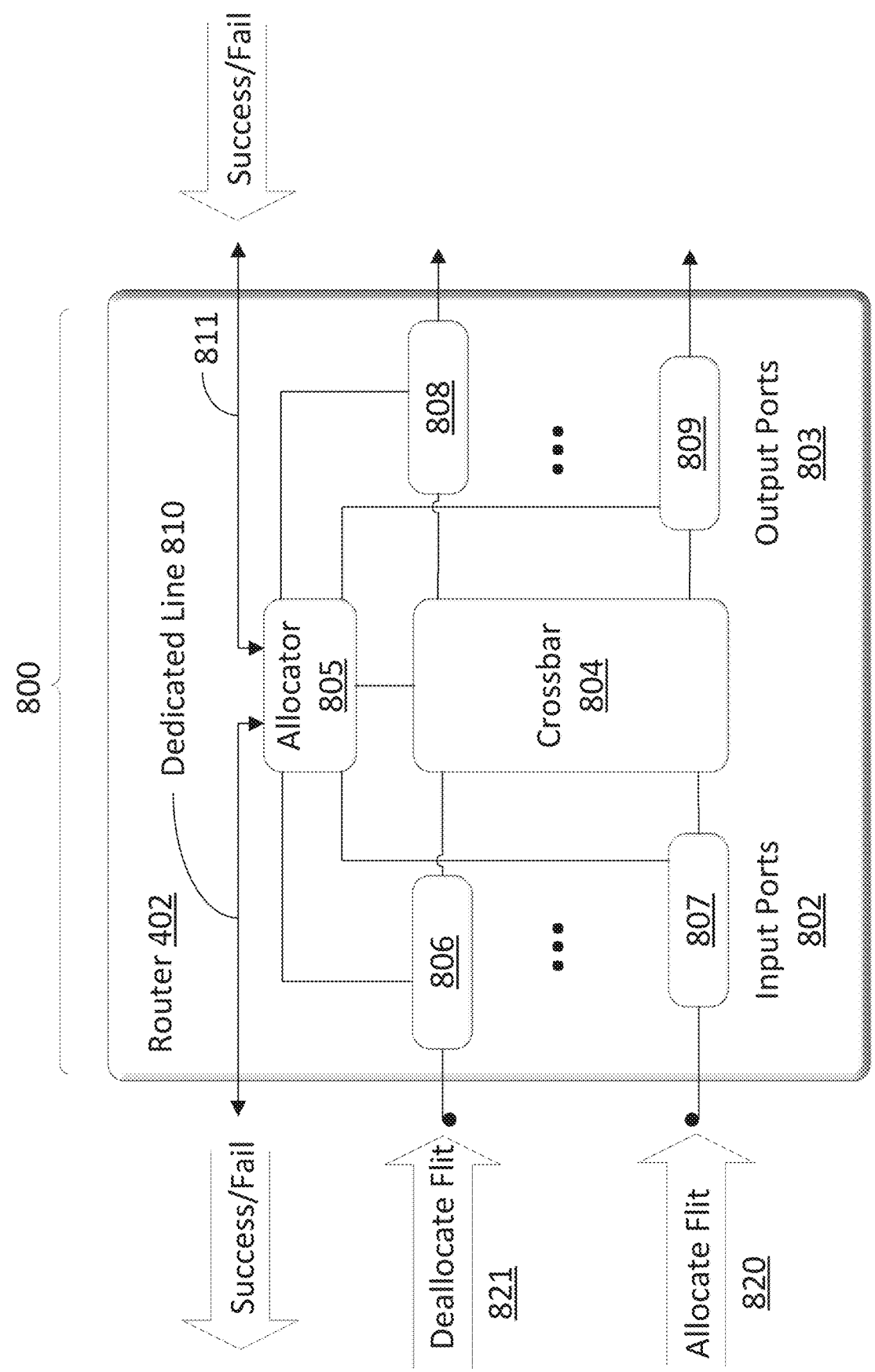
FIG. 8 illustrates a block diagram of a router in accordance with specific embodiments of the invention disclosed herein.
Figure 9:
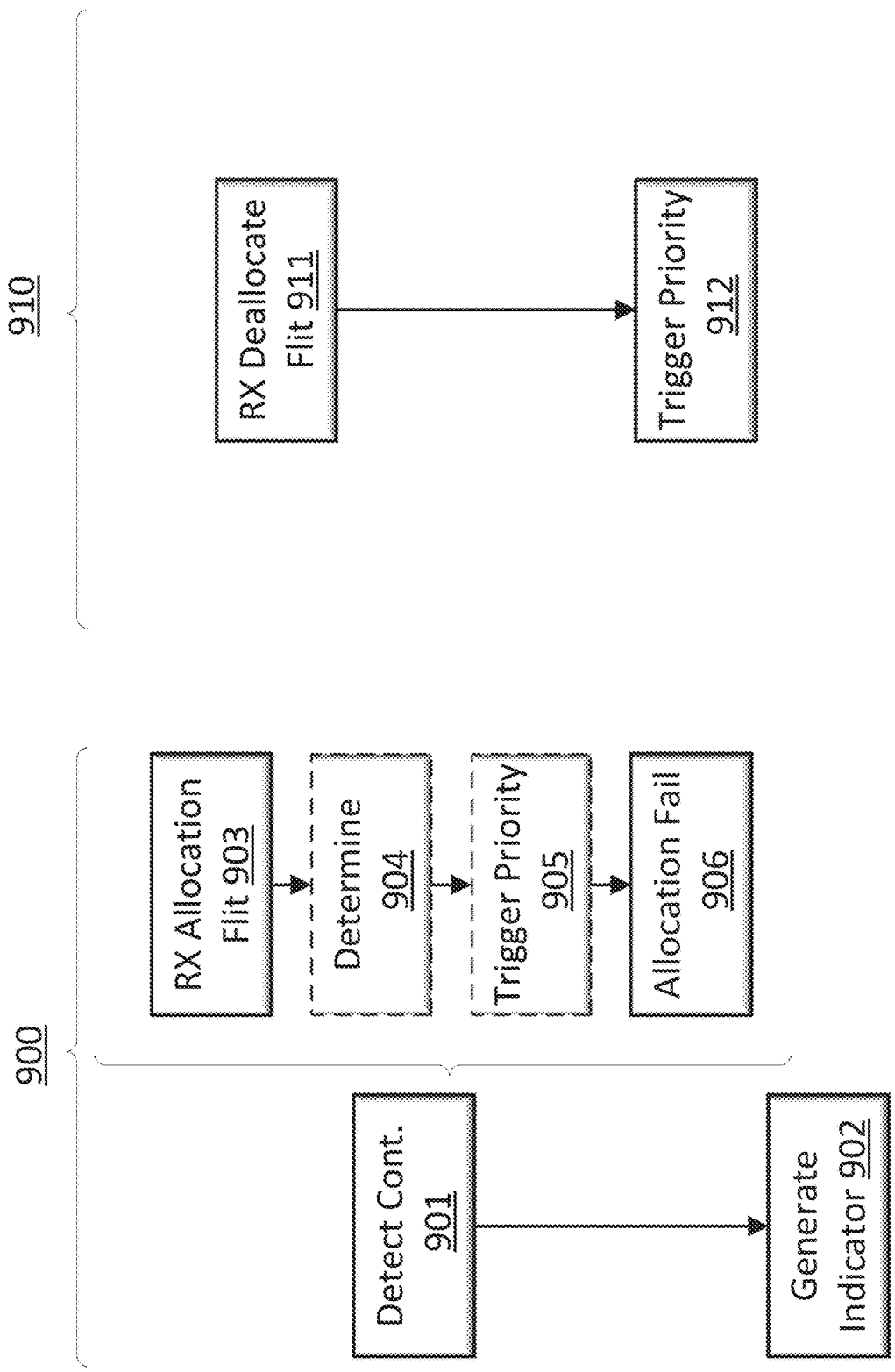
FIG. 9 illustrates a set of flow charts of processes that can be conducted by a router in accordance with specific embodiments of the invention disclosed herein.

The processes described above with reference to FIGS. 3-6 in terms of the behavior of specific nodes and the emergent behavior of the interconnect fabric can generally begin with detecting, while allocating the collection of resources that will support a data transmission, a resource contention at a node on the set of paths for the data transmission, and generating, at the node and in response to detecting the resource contention, an indicator of the resource contention. The indicator of the resource contention can be the fail messages described above. Specific embodiments of these steps can be described with reference to FIGS. 8-9.

In specific embodiments of the invention, an interconnect fabric can include a collection of distributed logic circuits, which are distributed among a set of nodes that comprise the interconnect fabric which are programmed to execute a method for conducting a multicast on the interconnect fabric which includes detecting, while allocating a collection of resources to support the multicast, a resource contention at a node in the set of nodes. The step is illustrated by step 901 in flow chart 900 in FIG. 9. The step can be conducted on a router of the interconnect fabric such as router 402, the details of which are illustrated in block diagram 800. The router includes a set of input ports 802, a set of output ports 803, a crossbar 804, and an allocator 805. The set of input ports 802 will include a set of buffers illustrated by buffer 806 and 807 and an ellipse indicating that there are as many buffers as there are inputs to the router. The set of output ports 803 will include a set of buffers illustrated by buffer 808 and 809 and an ellipse indicating that there are as many buffers as there are outputs from the router. The number of inputs and outputs will depend on the topology and is, as with the topology itself, not a limitation of the present invention. In specific embodiments of the invention, the channels of crossbar 804 and the buffers that comprise the set of input ports and output ports comprise the resources that must be used to support a data transmission on the fabric. As such, detecting a resource contention on the node, as in step 901, can involve a router detecting that it does not have sufficient resources in terms of buffer space or crossbar channels to support another data transmission because an existing data transmission is using those resources.

In specific embodiments of the invention, the detection of a resource contention at a node can occur in a router at the node and can involve processing an allocate message by the router. The step can also be part of the standard allocation of resources for a transmission through the interconnect fabric. In flow chart 900, this step is represented by a step 903 of receiving an allocate flit at a node. The allocate message can be allocate flit 820 received at buffer 807 in block diagram 800. The resource contention can then be detected by detecting a failed allocation for the allocate flit. This step is represented by a step 906 of detecting a failed allocation for the allocate flit. This step can involve allocator 805 reviewing the request for resource allocation in the allocate flit and determining that the router 402 cannot support the requested resource allocation. The failed allocation can result from a lack of an available buffer or crossbar channel on router 402 to support the virtual channel requested by allocate flit 820. The virtual channel can require allocator 805 to assign at least one buffer in output ports 803, at least one buffer in input ports 802, and at least one crossbar channel from a set of crossbar channels in crossbar 804 between those buffers. If those resources are not available because the router is supporting more transmissions than it is capable of, the allocator 805 can immediately return a failure indicator on dedicated line 810 and deallocate any resources that have already been assigned for the transmission. Notably, the architecture of router 402 also allows an intermittent node to receive success or fail messages received from downstream on a second dedicated line 811, deallocate resources on the node represented in block diagram 800 in response to the fail messages by processing the fail messages with allocator 805, and forward the success or fail messages upstream on dedicated line 810. Dedicated lines 810 and second dedicated line 811 can be dedicated signal lines in a set of dedicated signal lines connecting all of the nodes in a set of nodes in the interconnect fabric. The set of dedicated signal lines can run in parallel to the data transmission lines of the interconnect fabric and follow the same pattern of hops through the interconnect fabric. Additionally, the dedicated lines can be bi-directional regardless of whether or not the topology is a single or double directional topology.

In specific embodiments of the invention, an interconnect fabric can include a collection of distributed logic circuits, which are distributed among a set of nodes that comprise the interconnect fabric and which are programmed to execute a method for conducting a multicast on the interconnect fabric which includes generating, at the node and in response to detecting the resource contention, an indicator of the resource contention. The indicator of the resource contention can be sent upstream on a dedicated signal line. With reference to flow chart 900 in FIG. 9, the step of generating the indicator of the resource contention is represented by step 902. The process can be conducted immediately upon detecting a resource contention at a node and can involve the generation of a failure signal for transmission upstream from the node. For example, it could involve allocator 805 creating a signal for transmission on dedicated signal line 810. In alternative embodiments this step can involve generating a signal for transmission back along the main data lines of the interconnect fabric.

In specific embodiments of the invention, the processing of allocate messages can be prioritized in order to limit the amount of time it takes for messages regarding the failure of a resource allocation to be returned to branch or source nodes in the system. For example, the receipt of an allocate flit by a router could trigger a prioritized allocate flit processing routine to override the processing of other messages by an allocator on the router. In general, processing a flit includes receiving a flit at an input buffer, allocating a virtual channel for the packet or other transmission associated with the flit, arbitrating the crossbar, and outputting the data to an output buffer. Allocating the virtual channel can involve assuring that the router is set to reserve room to receiving and send flits through the identified channel until the channel is no longer needed. This regular pipeline for flit processing can include 4-5 clock cycles per hop. In specific embodiments of the invention, the logic circuits of the routers in the interconnect fabric are programmed to prioritize path allocate messages and process them immediately. This results in either an immediate allocation and forwarding of the allocate message downstream, or the report of a failed allocation and the prevention or unwinding of any resource allocation for that transmission on the router. In specific embodiments of the invention, the distributed logic of the interconnect fabric can be programmed to conduct this action in two cycles per hop. The first cycle receives and identifies the flit as an allocate flit, and the second cycle checks to see if allocation is available and immediately assigns the resource and forwards the flit or returns a fail message. In specific embodiments this is done by using flits which have a reserved header bit that is written to a reserved register on the input ports of the routers in the interconnect fabric to trigger the prioritized flit processing routine.

Flow chart 900 includes optional steps 904 and 905 to illustrate the steps associated with the prioritized processing of an allocate message. In specific embodiments of the invention, detecting a resource contention can comprise a step 904 of determining that an allocate flit is a multicast allocate flit and a step 905 of triggering a prioritized flit processing routine at the node in response to determining that the allocate flit is a multicast allocate flit. A standard flit processing routine at the node can take a larger amount of clock cycles than the prioritized flit processing routine. For example, as described above, a regular flit processing routine can take 4-5 clock cycles while a prioritized flit processing routine can be done in two clock cycles.

In specific embodiments of the invention, the processing of deallocate messages can be prioritized. The priority processing of deallocate messages can be prioritized using the same routine as is used for prioritizing the processing of allocate messages. In specific embodiments, allocation and deallocate messages will both be received from upstream along a transmission path and on the same hardware. For example, the allocation and deallocate messages could be received in and processed similar to the manner in which header and tail flits of a wormhole routed packet can be received and processed by a router. Flow chart 910 illustrates a method of deallocating a collection of resources which includes a step 911 of receiving a deallocate message at a node. The node can be a node downstream from a branch node that generated the deallocate message. For example, the deallocate message could be deallocate message 821 received from an upstream node on input buffer 806 in block diagram 800. The flow chart also includes a step 912 of triggering a prioritized flit processing routine at the downstream node in response to receiving the deallocate message. The prioritized flit processing routine can be the same prioritized flit processing routine mentioned above regarding allocate messages. In specific embodiments of the invention, deallocate messages can use the same dedicated bit in the header of the messages as is used by the allocate messages of the embodiments mentioned above.

In specific embodiments of the invention, the interconnect fabric can include the ability to switch off the logic associated with the implementation of speculative allocation. The process can involve determining that speculative allocation will not be required and deactivating steps associated with the speculative allocation approaches disclosed herein. The determining can involve determining that, for a given workload which the terminals of the interconnect fabric will operate on, deadlock conditions are not possible or are entirely avoidable using specific rules for controlling the execution of the workload and the transmission of data through the interconnect fabric. The determining and deactivation can be conducted by a higher-level system than the interconnect fabric hardware and routers. For example, the steps could be executed by a controller on one of the terminals of the interconnect network such as a processing core in the place of terminal 401. Alternatively, the interconnect network could have a dedicated higher-level controller to serve this role. The controller could also serve as a terminal to the interconnect network and be specifically dedicated to set a state of the various routers for debugging, initializing, maintaining, and testing the interconnect network.

In specific embodiments of the invention, the determining mentioned in the prior paragraph can be conducted by a compiler which is tasked with compiling the program code for a workload on which the terminals of an interconnect fabric will be operating. For particular workloads, the compiler that produces the program code of the workload may be able to determine statically at compile-time that deadlock conditions are entirely avoidable such that the overhead associated with speculative allocation would be superfluous. The compiler could make this decision for the entire workload or on a transmission-by-transmission basis. This process could include compiling a set of instructions for execution on a set of processing cores and determining that multicast resource contention is avoidable for one or more transmissions which will be conducted during the execution of the instructions. The process can involve statically tagging transfer instructions as requiring speculative allocation or not. In specific embodiments of the invention, no additional mechanism is needed to support this optimization at run-time in the hardware that is executing the workload. The compiling and determination steps can be controlled by the higher-level control systems mentioned above.

In specific embodiments of the invention, the deactivating of the speculative allocation process can be conducted in various ways. This process could include compiling a set of instructions for execution on a set of processing cores linked by the interconnect fabric using a compiler and deactivating a resource contention detection routine when the compiler determines that multicast resource contention is avoidable. Deactivating speculative allocation could include deactivating a hold time at the source node, or all source nodes, used for transmitting data through the interconnect fabric such that they would not hold to receive responses from the terminal nodes of a transmission prior to commencing the transmission of data. The deactivation could be made on all the source nodes, on a specific set of source nodes, or only when specific source nodes were executing a specific transmission. Deactivating speculative allocation could also include deactivating prioritized allocate message processing and any additional resource contention detection logic that adds additional overhead above and beyond the usual processing of an allocate message. The action of deactivating the speculative allocation process can be administrated by the higher-level control systems mentioned above and can include setting the value of a status register on the various routers that comprise the interconnect fabric so that they shut down any speculative allocation processing. Alternatively, this action can involve setting a header bit on messages that are to be sent through the interconnect fabric to indicate that they should not be processed in accordance with speculative allocation processing, or setting a flag on specific instructions that will be compiled into transmissions by the routers of the interconnect fabric. The action of deactivating can also include a combination of setting a state of the routers of the interconnect fabric and altering the headers of data that will be transmitted through the interconnect fabric. The compiling, determination, and deactivation can be controlled by the higher-level control systems mentioned above In specific embodiments of the invention, all steps of flow chart 300 can be executed entirely in hardware such as in distributed logic circuits implemented on the routers disclosed herein and the signal lines connecting those routers. For example, in the disclosed embodiments in which multicast 311 could accordingly be a multicast distributing data for a composite computation being executed by the set of processing cores, all the method steps disclosed herein could be conducted by hardware in the interconnect fabric without any computation on any of such processing cores. As such, the various processing cores can conduct their individual component computations of the composite computation without concern for the operation of the routing and flow control algorithms of the interconnect fabric.

While the specification has been described in detail with respect to specific embodiments of the invention, it will be appreciated that those skilled in the art, upon attaining an understanding of the foregoing, may readily conceive of alterations to, variations of, and equivalents to these embodiments. The specification should not be limited to apply to an interconnect fabric for a set of processing cores conducting a complex computation as the disclosed interconnect fabric and associated methods can be applied to improve the performance of SoCs having widely variant terminals. Furthermore, the disclosure should not be limited to any specific type of complex computation being executed on a multi-core processor as the programming of and execution of any complex computation can be aided by specific embodiments disclosed herein including training or drawing an inference from an artificial neural network, or executing a hashing, encryption, decryption, or graphics rendering algorithm involving a large number of component computations. These and other modifications and variations to the present invention may be practiced by those skilled in the art, without departing from the scope of the present invention, which is more particularly set forth in the appended claims.

What is claimed is:

1. A method for conducting a multicast on an interconnect fabric, comprising:
allocating a collection of resources to support a set of paths through the interconnect fabric, whereby the set of paths are speculatively allocated for the multicast;
aggregating a set of responses from the set of paths at a branch node on the set of paths, wherein the set of responses include an indicator of a resource contention;
transmitting, from the branch node and in response to the indicator of the resource contention, a deallocate message downstream and the indicator of the resource contention upstream;
deallocating, in response to the deallocate message, the collection of resources for a hold period; and
reallocating resources for the multicast after the hold period.

2. The method of claim 1, further comprising:
detecting, while allocating the collection of resources, the resource contention at a node on the set of paths; and
generating, at the node and in response to detecting the resource contention, the indicator of the resource contention.

3. The method of claim 2, wherein:
the interconnect fabric links a set of processing cores;
the node includes a processing core from the set of processing cores and a router from a set of routers;
the branch node includes another processing core from the set of processing cores and another router from the set of routers;
the multicast distributes data for a composite computation being executed by the set of processing cores; and
all the steps of the method are conducted by hardware in the interconnect fabric and without any computation on any of the processing cores.

4. The method of claim 1, wherein:
the allocating is conducted locally on a node-by-node basis; and
without any information regarding a global state of the interconnect fabric.

5. The method of claim 2, wherein:
the detecting occurs in a router at the node;
the generating of the indicator occurs on the router at the node; and
the indicator of the resource contention is sent upstream on a dedicated signal line.

6. The method of claim 2, wherein detecting the resource contention further comprises:
receiving an allocate flit at the node; and
detecting a failed allocation for the allocate flit.

7. The method of claim 6, wherein:
the collection of resources includes a set of buffers and a set of crossbar channels;
the detecting occurs in a router at the node; and
the failed allocation results from a lack of an available buffer or crossbar channel on the router.

8. The method of claim 2, wherein detecting the resource contention further comprises:
receiving an allocate flit at the node;
determining that the allocate flit is a multicast allocate flit;
triggering a prioritized flit processing routine at the node in response to determining that the allocate flit is a multicast allocate flit; and
wherein a standard flit processing routine at the node takes a larger amount of clock cycles than the prioritized flit processing routine.

9. The method of claim 1, wherein deallocating the collection of resources further comprises:
receiving the deallocate message at a downstream node, wherein the downstream node is downstream from the branch node; and
triggering a prioritized flit processing routine at the downstream node in response to receiving the deallocate message.

10. The method of claim 1, further comprising:
determining a duration of the hold period at a source node; and
wherein the duration is one of: (i) random; and (ii) exponentially increasing based on a number of allocation attempts.

11. The method of claim 1, further comprising:
compiling a set of instructions for execution on a set of processing cores linked by the interconnect fabric using a compiler; and
deactivating a resource contention detection routine when the compiler determines that multicast resource contention is avoidable.

12. An interconnect fabric, comprising:
a set of nodes;
a set of routers, wherein the set of nodes and the set of routers have a one-to-one correspondence; and
a collection of distributed logic circuits, which are distributed among the set of nodes, and which are programmed to execute a method for conducting a multicast on the interconnect fabric, the method comprising:
allocating a collection of resources on the set of routers to support a set of paths through the set of nodes, whereby the set of paths are speculatively allocated for the multicast of data;
aggregating a set of responses from the set of paths at a branch node in the set of nodes, wherein the set of responses include an indicator of a resource contention;
transmitting, from the branch node and in response to the indicator of the resource contention, a deallocate message downstream and the indicator of the resource contention upstream;
deallocating, in response to the deallocate message, the collection of resources for a hold period; and
reallocating resources for the multicast after the hold period.

13. The interconnect fabric of claim 12, the method further comprising:
detecting, while allocating the collection of resources, the resource contention at a node in the set of nodes; and
generating, at the node and in response to detecting the resource contention, the indicator of the resource contention.

14. The interconnect fabric of claim 13, further comprising:
a set of terminals of the interconnect fabric, wherein the set of terminals are processing cores;
wherein the node and the branch node each include processing cores from the set of terminals and routers from a set of routers; and
wherein the multicast distributes data for a composite computation being executed by the processing cores.

15. The interconnect fabric of claim 12, wherein:
the allocating is conducted locally on a node-by-node basis; and
without any information regarding a global state of the interconnect fabric.

16. The interconnect fabric of claim 13, further comprising:
a set of dedicated signal lines connected to the set of nodes;
wherein the detecting occurs in a router at the node;
wherein the generating of the indicator occurs on the router at the node; and
wherein the indicator of the resource contention is sent upstream on a dedicated signal line in the set of dedicated signal lines.

17. The interconnect fabric of claim 13, wherein detecting the resource contention further comprises:
receiving an allocate flit at the node; and
detecting a failed allocation for the allocate flit.

18. The interconnect fabric of claim 17, wherein:
the collection of resources includes a set of buffers and a set of crossbar channels;
the detecting occurs in a router at the node; and
the failed allocation results from a lack of an available buffer or crossbar channel on the router.

19. The interconnect fabric of claim 13, further comprising:
an allocator at the node; and
wherein detecting the resource contention further comprises:
receiving an allocate flit at the node;
determining that the allocate flit is a multicast allocate flit;
triggering a prioritized flit processing routine on the allocator in response to determining that the allocate flit is a multicast allocate flit; and
wherein a standard flit processing routine on the allocator takes a larger amount of clock cycles than the prioritized flit processing routine.

20. The interconnect fabric of claim 12, wherein deallocating the collection of resources further comprises:
receiving the deallocate message at a downstream node, wherein the downstream node is downstream from the branch node; and
triggering a prioritized flit processing routine at the downstream node in response to receiving the deallocate message.

21. The interconnect fabric of claim 12, the method further comprising:
determining a duration of the hold period at a source node; and
wherein the duration is one of: (i) random; and (ii) exponentially increasing based on a number of allocation attempts.

22. The interconnect fabric of claim 12, further comprising:
a controller programmed to execute a control method comprising:
compiling a set of instructions for execution on a set of processing cores linked by the interconnect fabric using a compiler; and
deactivating a resource contention detection routine when the compiler determines multicast resource contention is avoidable.

23. A method for supporting a multicast on an interconnect fabric, comprising:
receiving, at a branch node on the interconnect fabric, an allocate message for a resource to support a path for the multicast;
transmitting, from the branch node, the allocate message to a set of paths that stem from the branch node;
receiving, at the branch node, a set of responses from the set of paths that stem from the node, wherein the set of responses include an indicator of a resource contention;
transmitting from the branch node and in response to the indicator of the resource contention, a downstream deallocate message to at least one of the paths in the set of paths; and
transmitting from the branch node and in response to the indicator of the resource contention, an upstream indicator of the resource contention.

24. A node for an interconnect fabric, comprising:
a router; and
a logic circuit, programmed to execute a method for supporting a multicast on the interconnect fabric, the method comprising:
receiving, at the router, an allocate message for a resource to support a path for the multicast;
transmitting, using the router, the allocate message to a set of paths that stem from the node;
receiving, at the router, a set of responses from the set of paths that stem from the node, wherein the set of responses include an indicator of a resource contention;

transmitting, using the router and in response to the indicator of the resource contention, a downstream deallocate message to at least one of the paths in the set of paths; and transmitting, using the router and in response to the indicator of the resource contention, an upstream indicator of the resource contention.

* * * * *